United States Patent
Palermo, Jr. et al.

(10) Patent No.: US 10,809,756 B1
(45) Date of Patent: Oct. 20, 2020

(54) CRANK HANDLE DRIVE DEVICE

(71) Applicant: EZ Jack LLC, Sulphur, LA (US)

(72) Inventors: Joe R. Palermo, Jr., Sulphur, LA (US); Trevor W. Richard, Lake Charles, LA (US)

(73) Assignee: EZ Jack LLC, Sulphur, LA (US)

( * ) Notice: Subject to any disclaimer, the term of this patent is extended or adjusted under 35 U.S.C. 154(b) by 0 days.

(21) Appl. No.: 16/416,916

(22) Filed: May 20, 2019

Related U.S. Application Data

(63) Continuation of application No. 16/381,276, filed on Apr. 11, 2019, now Pat. No. 10,496,123.

(51) Int. Cl.
  G05G 1/08 (2006.01)
  B60D 1/46 (2006.01)

(52) U.S. Cl.
  CPC ............ G05G 1/085 (2013.01); B60D 1/465 (2013.01); *Y10T 74/20744* (2015.01)

(58) Field of Classification Search
  CPC . G05G 1/085; B60D 1/42; B60D 1/44; B60D 1/46; B60D 1/465; Y10T 74/20744; Y10T 74/20642; A01K 89/006; B25G 1/007; B66D 1/06
  See application file for complete search history.

(56) References Cited

U.S. PATENT DOCUMENTS

| | | | | |
|---|---|---|---|---|
| 6,257,104 B1* | 7/2001 | Jarrett | ................... | B25B 13/005 81/177.8 |
| 7,204,788 B2* | 4/2007 | Andrews | .................. | B62M 3/02 482/57 |
| 9,039,000 B2* | 5/2015 | Smith | .................... | B25H 1/005 144/136.1 |
| 2007/0257243 A1* | 11/2007 | Cofer | ........................ | B60S 9/08 254/419 |
| 2009/0199345 A1* | 8/2009 | Morgan | .................... | B25F 1/04 7/118 |
| 2010/0263476 A1* | 10/2010 | Peschmann | ............ | G05G 1/085 74/546 |
| 2014/0335987 A1* | 11/2014 | Iwai | ........................ | B62M 9/10 474/161 |
| 2014/0375092 A1* | 12/2014 | Curless | .................... | B62J 1/005 297/201 |

* cited by examiner

*Primary Examiner* — Jeremy R Severson
(74) *Attorney, Agent, or Firm* — Meunier Carlin & Curfman LLC

(57) ABSTRACT

Various implementations include a handle attachment device. The device includes a body and a drive shaft. The body has a first portion and a second portion. Each of the first portion and second portion defines at least one fastener opening. Each of the at least one fastener opening defined by the first portion is alignable with one of the at least one fastener opening defined by the second portion. The first portion and the second portion are clampable on a crank when the device is in a mounted position. The crank has a crank rotational axis.

6 Claims, 4 Drawing Sheets

CRANK HANDLE DRIVE DEVICE

BACKGROUND

Manual crank handles are used on trailer jacks to lower and raise the trailer coupler onto and off of the receiver hitch of a vehicle. Typically, the jack includes a series of gears to drive the jack foot vertically, which raises or lowers the end of the trailer. The trailer jack includes a manual crank handle to drive the jack. However, these jacks can require a large amount of torque to raise the trailer depending on the load that the trailer is carrying, making it difficult for some users to operate.

Thus, a need exists for a device that is cheap and easy to use that enables a user to easily operate a manual crank handle.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

Various implementations include a handle attachment device. The device includes a body and a drive shaft. The body has a first portion and a second portion. Each of the first portion and second portion defines at least one fastener opening. Each of the at least one fastener opening defined by the first portion is alignable with one of the at least one fastener opening defined by the second portion. The first portion and the second portion are clampable on a crank when the device is in a mounted position. The crank has a crank rotational axis.

The drive shaft is coupled to the body. The drive shaft has a drive shaft axis, an end distal to the body, and an engagement head coupled to the end. The drive shaft axis is coincident with the crank rotational axis when the body is clamped to the crank.

Various other implementations include a crank. The crank includes a first portion, a second portion, and a drive shaft. The first portion extends along a crank rotational axis. The first portion has a first end and a second end. The second portion extends transverse to the crank rotational axis. The drive shaft is coupled to the second end of the first portion. The drive shaft has a drive shaft axis, an end distal to the first portion, and an engagement head coupled to the end. The drive shaft axis is coincident with the crank rotational axis.

The devices disclosed herein include devices for coupling to crank handles and devices that are coupled to crank handles. The devices include a drive shaft with an engagement head that is aligned, or are alignable with, the crank rotational axis. A user of the crank handle can couple a driver, such as a drill, to the engagement head to rotate the crank handle rather than manually turning the crank handle.

Figure 1:
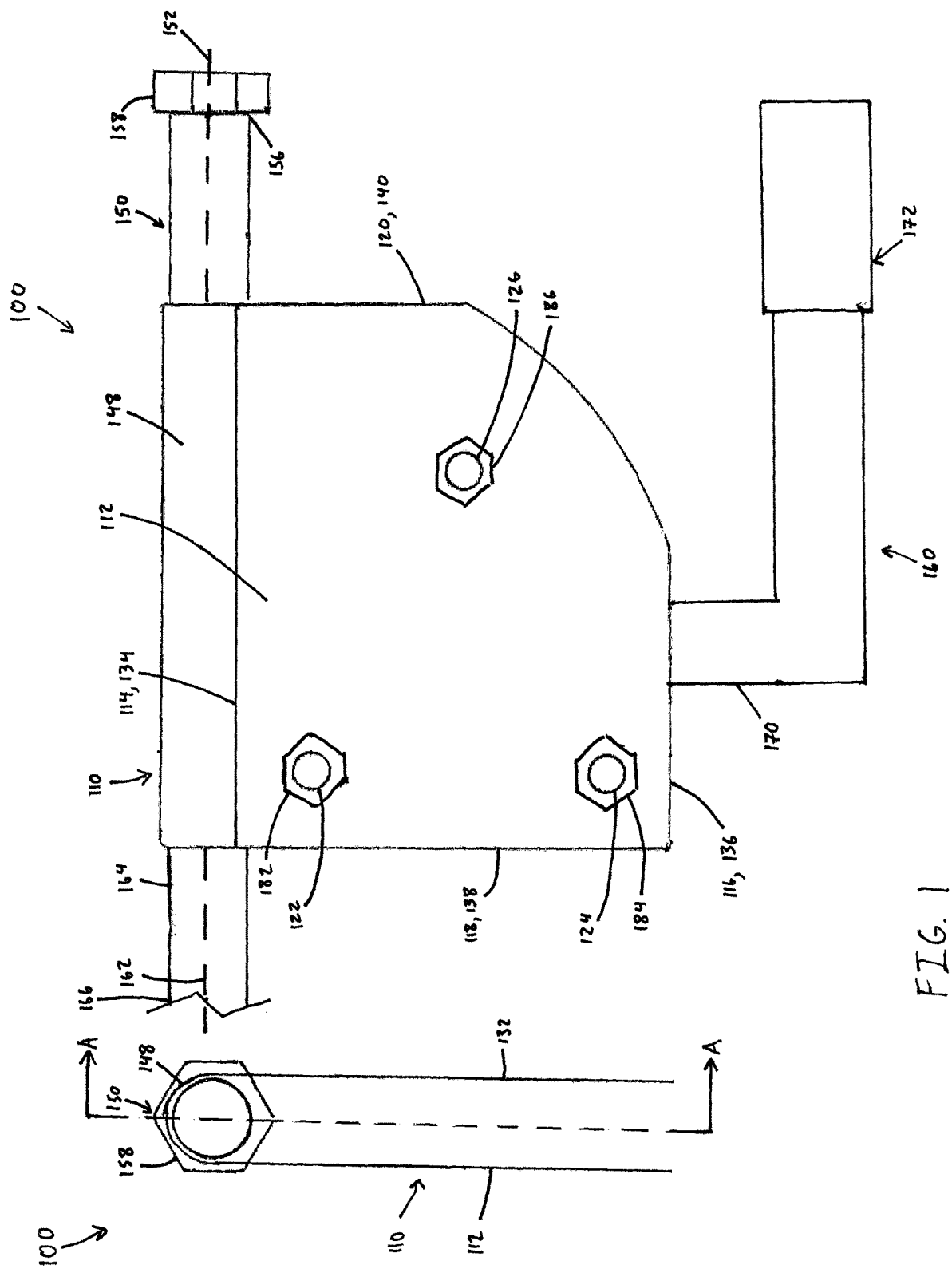
FIG. 1 is a side view and an end view of a handle attachment device, according to one implementation.
Figure 2:
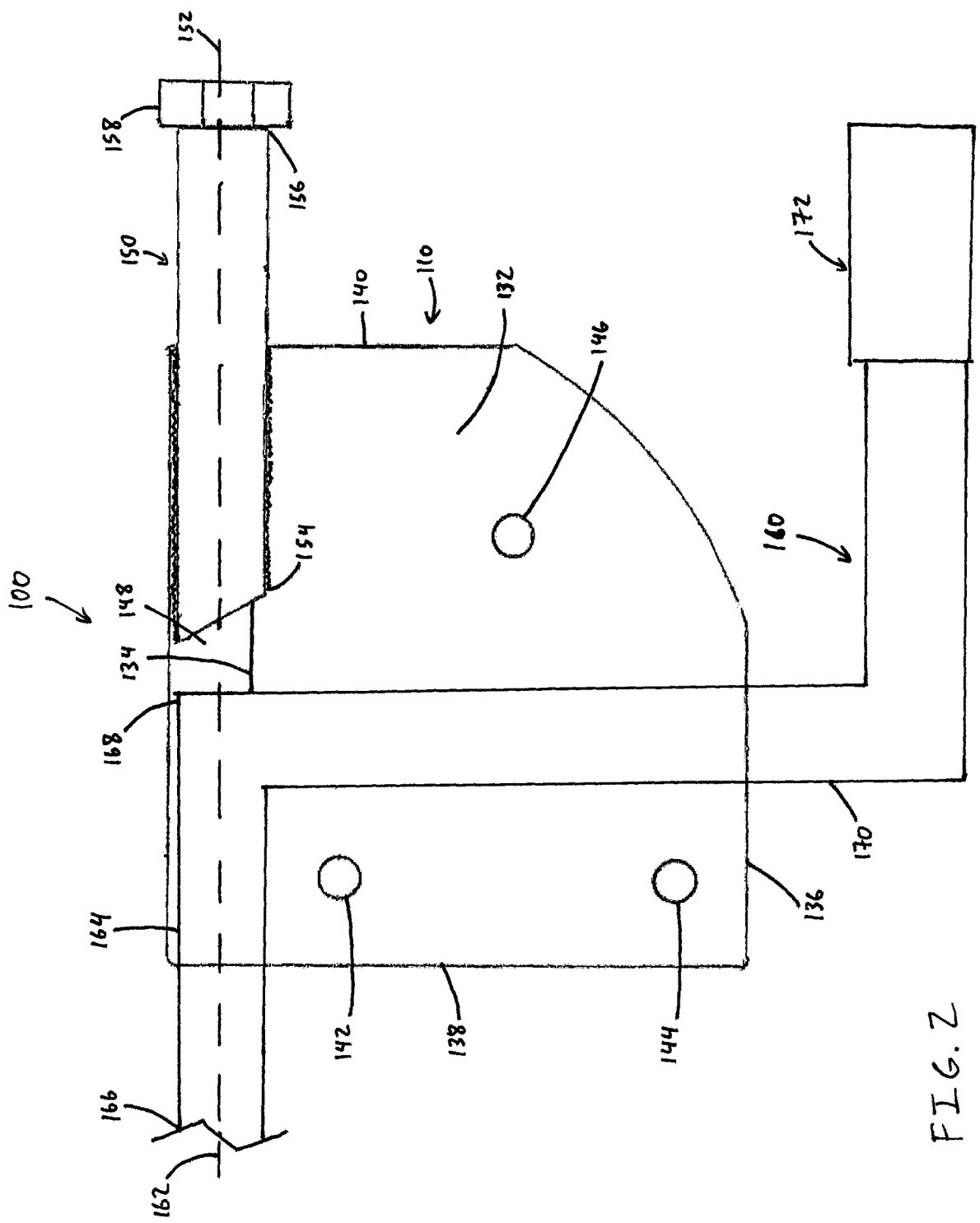
FIG. 2 is a sectional view of the handle attachment device of FIG. 1 along section line A-A.

FIGS. 1 and 2 shows a perspective view of a handle attachment device 100. The device 100 includes a body 110 and a drive shaft 150. The device 100 is shown in the mounted position coupled to a crank 160. The crank 160 has a first crank portion 164 and a second crank portion 170. The first crank portion 164 has a first end 166 and a second end 168 spaced apart and opposite the first end 166. The first crank portion 164 extends from the first end 166 to the second end 168 along a crank rotational axis 162. The second crank portion 170 is coupled to the second end 168 of the first crank portion 164 and extends at an angle transverse to the crank rotational axis 162. A handle 172 is coupled to the second crank portion 170.

The body 110 has a first portion 112 and a second portion 132. The first portion 112 and the second portion 132 of the body 110 of the handle attachment device 100 each have a first edge 114, 134 and a second edge 116, 136 opposite and spaced apart from each other, and a third edge 118, 138 and a fourth edge 120, 140 spaced apart and opposite each other. The device 100 also includes an intermediate portion 148 extending between first edges 114, 134 of both the first portion 112 and the second portion 132. The first portion 112, second portion 132, and intermediate portion 148 are integrally formed from a single sheet of stainless steel. The sheet of stainless steel is bent along the intermediate portion 148 to form a "U-shape" such that the first portion 112 and the second portion 132 are substantially parallel to each other. However, in other implementations, the body of the device comprises galvanized steel, aluminum, plastic, or any other material capable of withstanding torque from the driver when the device is in use. In some implementations, the intermediate portion is not integrally formed with the first portion and the second portion, and the intermediate portion is coupled to the first portion and the second portion by welding, adhesive, fastener, or any other method of coupling capable of withstanding torque of the driver when the device is in use. When the device 100 is coupled to a crank 160 in a mounted position, the crank 160 is disposed between the first portion 112 and the second portion 132. Fasteners 182, 184, 186 disposed in fastener openings 122, 142, 124, 144, 126, 146 defined by the first portion 112 and second portion 132 are tightened to clamp the crank 160 between the first portion 112 and second portion 132, as discussed below.

The drive shaft 150 has a proximal end 154 and a distal end 156 opposite and spaced apart from the proximal end 154 such that the drive shaft 150 extends from the proximal end 154 to the distal end 156 along a drive shaft axis 152. The drive shaft 150 is welded to the body 110 such that the drive shaft 150 is disposed between the first portion 112 and the second portion 132 and the distal end 156 extends away from the body 110. The drive shaft 150 is positioned such that the drive shaft axis 152 and the crank rotational axis 162 are coincident with each other. Thus, rotation of the drive shaft 150 causes the crank 160 to rotate about the crank rotational axis 162. Although the drive shaft 150 shown in FIGS. 1 and 2 is welded to the body 110, in other implementations, the drive shaft is integrally formed with the body or is coupled to the body by adhesive, fastener, compression fit, pinning, or any other method of coupling capable of withstanding torque of the driver when the device is in use. The drive shaft 150 shown in FIGS. 1 and 2 comprises stainless steel, but in other implementations, the drive shaft comprises galvanized steel, aluminum, plastic, or any other material capable of withstanding torque from the driver when the device is in use.

An engagement head 158 is coupled to the distal end 156 of the drive shaft 150. The engagement head 158 of the device 100 shown in FIGS. 1 and 2 is a hex head, but in other implementations, the engagement head is any other standard bolt head, such as a hex socket head, a square head, a slotted head, a Phillips head, a Torx head, a Robertson head or any other standard size such that the engagement head is engageable by a standard sized bit that is couplable to a driver, such as a drill, an impact driver, etc. In other implementations, the engagement head is a custom shape and size for engaging with a corresponding custom bit that is couplable to a driver. In other implementations, the head is cylindrical or no head is included, and the head and/or shaft is directly couplable to and engageable by the driver without a bit.

The first portion 112 and the second portion 132 each define three fastener openings 122, 142, 124, 144, 126, 146. The fastener openings 122, 124, 126 in the first portion 112 and the fastener openings 142, 144, 146 in the second portion 132 are alignable such that fasteners 182, 184, 186 can be disposed in corresponding fastener openings 122, 142, 124, 144, 126, 146 defined by the first portion 112 and the second portion 132. When the device 100 is coupled to a crank 160 in the mounted position, the fastener openings 122, 142, 124, 144, 126, 146 are positioned such that the fasteners 182, 184, 186 disposed within the fastener openings 122, 142, 124, 144, 126, 146 are located around the crank 160 to firmly contain the crank 160. A first fastener 182 is disposed within the first fastener openings 122, 142 in the first portion 112 and the second portion 132, a second fastener 184 is disposed within the second fastener openings 124, 144 in the first portion 112 and the second portion 132, and a third fastener 186 is disposed within the third fastener openings 126, 146 in the first portion 112 and the second portion 132. Although the fasteners 182, 184, 186 shown in FIGS. 1 and 2 are hex head bolts fastened with nuts, in other implementations, the fasteners are brads, rivets, ties, buttons, zippers, clips, or any other device capable of urging the first portion and second portion toward each other such that a crank is firmly clamped between the first portion and second portion.

The first fastener openings 122, 142 in the first portion 112 and the second portion 132 are positioned near the respective third edges 118, 138 such that the first crank portion 164 is disposable between the first fastener 182 and the intermediate portion 148. The position of the first fastener openings 122, 142 in the first portion 112 and the second portion 132 ensures that the crank rotational axis 162 is aligned with the drive shaft axis 152.

The second fastener openings 124, 144 in the first portion 112 and the second portion 132 are also positioned near the respective third edges 118, 138. The first fastener openings 122, 124 and second fastener openings 124, 144 are defined along a line parallel to a second crank portion 170 that is transverse to the crank rotational axis 162. The second crank portion 170 shown in FIGS. 1 and 2 is perpendicular to the first crank portion 164, so the first fastener openings 122, 124 and the second fastener openings 124, 144 are perpendicular to the drive shaft axis 152. However, in other implementations, the device is designed for being coupled to a crank with the second crank portion at any other angle to the first crank portion such that the first fastener openings and the second fastener openings are parallel to the second crank portion and at the same angle to the drive shaft axis.

The third fastener openings 126, 146 are defined between the respective fourth edges 120, 140 and the first and second fastener openings 122, 142, 124, 144. The third fastener openings 126, 146 are positioned such that when the device 100 is coupled to the crank 160 in the mounted position, the second crank portion 170 is disposed between the first fastener openings 122, 142 and the third fastener openings 126, 146, and between the second fastener openings 124, 144 and the third fastener openings 126, 146. The position of the third fastener openings 126, 146 relative to the first fastener openings 122, 142 and the second fastener openings 124, 144 ensures that the device 100 does not slide axially along the first crank portion 164.

Figure 4:
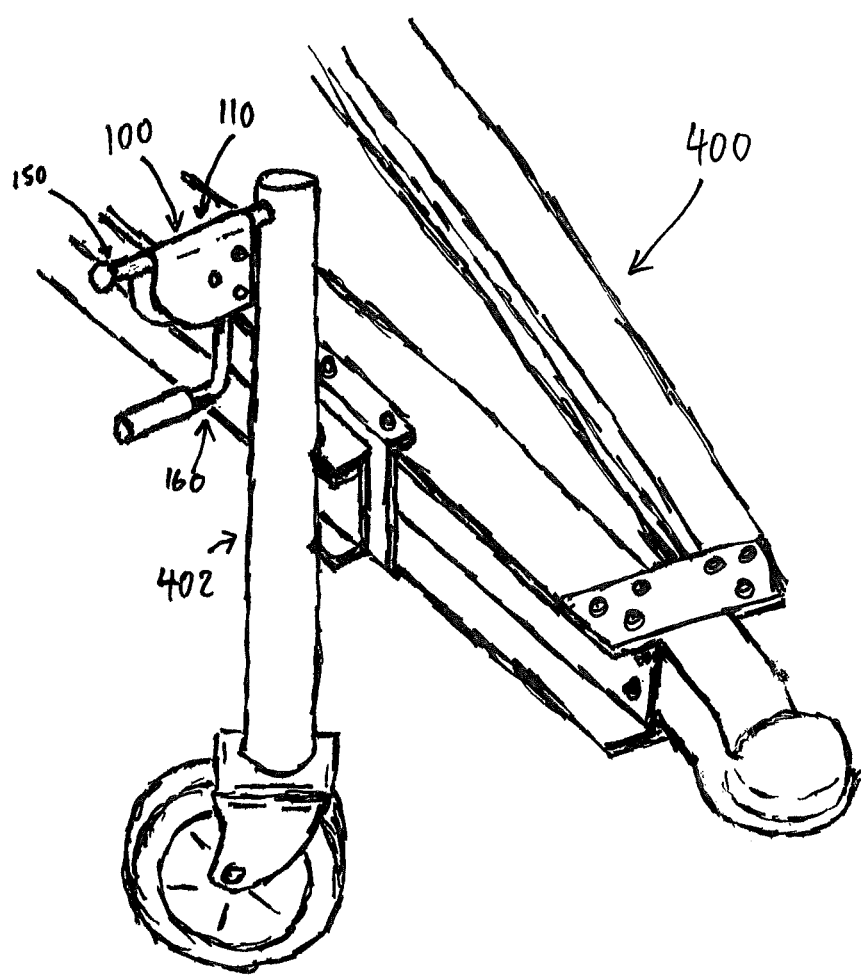
FIG. 4 is a perspective view of the handle attachment device of FIG. 1 in the mounted position on the crank of a trailer jack.

FIG. 4 shows the device 100 in the mounted position on the crank 160 of a jack 402 of a trailer 400. In use, the engagement head 158 is engaged by a driver, and the device 100 is rotated to rotate the crank 160. As the crank 160 rotates, the jack 402 raises or lowers the trailer 400, depending on the direction the crank 160 is rotated.

Figure 3:
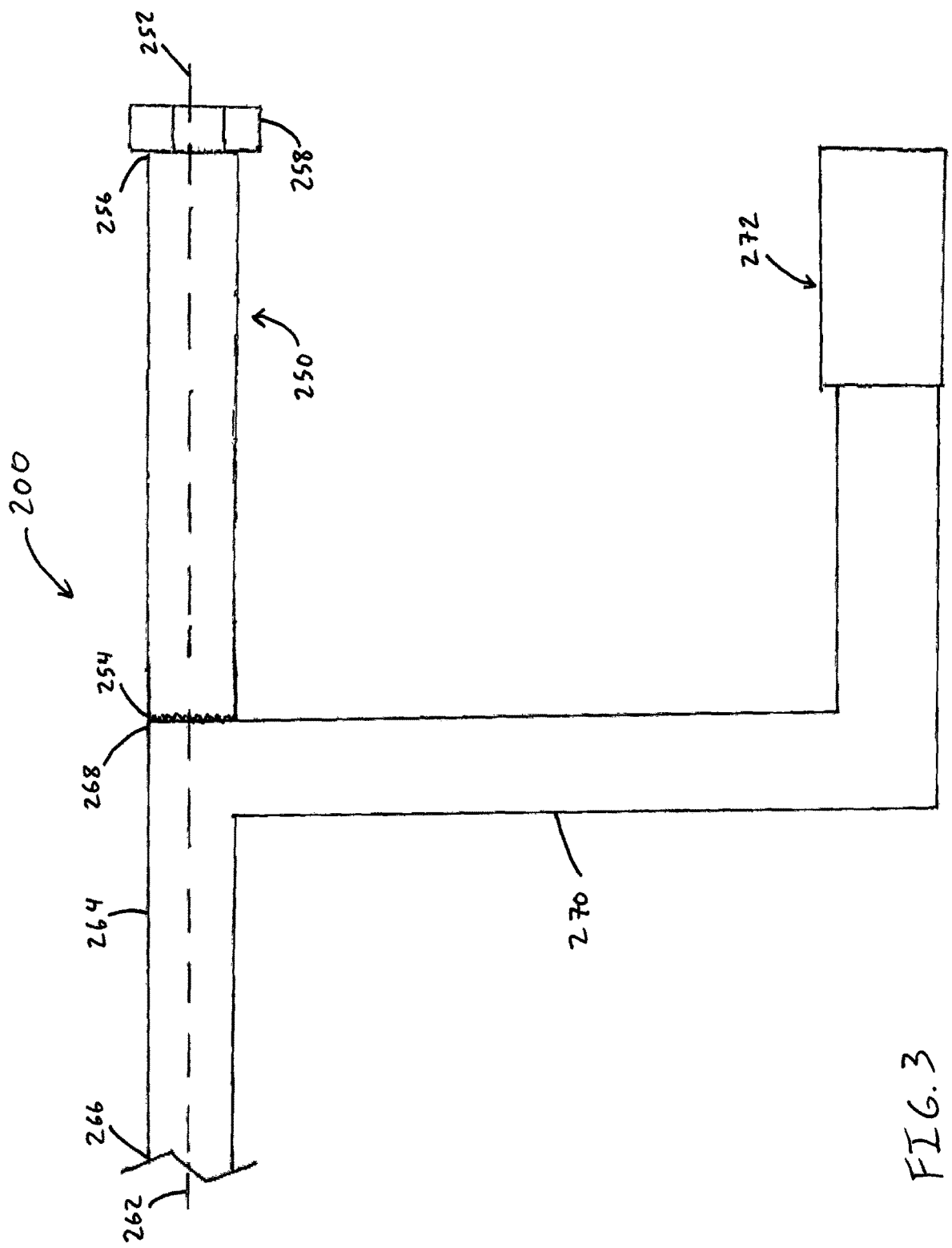
FIG. 3 is a side view of a crank, according to another implementation.

FIG. 3 shows a crank 200 having a drive shaft 250 similar to the drive shaft 150 of the device 100 shown in FIGS. 1 and 2. Similar to the crank 160 shown in FIGS. 1 and 2, the crank 200 in FIG. 3 has a first crank portion 264 and a second crank portion 270. The first crank portion 264 has a first end 266 and a second end 268 spaced apart and opposite the first end 266. The first crank portion 264 extends from the first end 266 to the second end 268 along a crank rotational axis 262. A second crank portion 270 is coupled to the second end 268 of the first crank portion 264 and extends at an angle transverse to the crank rotational axis 262. A handle 272 is coupled to the second crank portion 270.

The drive shaft 250 has a drive shaft axis 252, a distal end 256, a proximal end 254 opposite and spaced apart from the distal end 256, and an engagement head 258 coupled to the distal end 256. The proximal end 254 of the drive shaft 250 is welded to the second end 268 of the first crank portion 264 such that the drive shaft axis 252 is coincident with the crank rotational axis 262. However, in other implementations, the drive shaft is integrally formed with the crank or is coupled to the crank by adhesive, fastener, compression fit, pinning, or any other method of coupling capable of withstanding torque of the driver when the crank is in use. The drive shaft 250 shown in FIG. 3 comprises stainless steel, but in other implementations, the drive shaft comprises galvanized steel, aluminum, plastic, or any other material capable of withstanding torque from the driver when the crank is in use.

The engagement head 258 is coupled to the distal end 256 of the drive shaft 250. The engagement head 258 of the crank 200 shown in FIG. 3 is a hex head, but in other implementations, the engagement head is any other standard bolt head, such as a hex socket head, a square head, a slotted head, a Phillips head, a Torx head, a Robertson head or any other standard size such that the engagement head is engageable by a standard sized bit that is couplable to a driver, such as a drill, an impact driver, etc. In other implementations, the engagement head is a custom shape and size for engaging with a corresponding custom bit that is couplable to a driver. In other implementations, the head is cylindrical or no head is included, and the head and/or shaft is directly couplable to and engageable by the driver without a bit.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A crank comprising:
   a first portion extending along a crank rotational axis, the first portion having a first end and a second end;
   a second portion extending transverse to the crank rotational axis, the second portion having a first end coupled to the first portion and a second end spaced apart and opposite the first end of the second portion;
   a handle extending from a second end of the second portion, wherein the handle extends parallel to the crank rotational axis; and
   a drive shaft coupled to the second end of the first portion, the drive shaft having a drive shaft axis, an end distal to the first portion, and an engagement head coupled to the end, wherein the drive shaft axis is coincident with the crank rotational axis,
   wherein the first end of the first portion is configured to be rotationally coupled to a jack such that the second portion and the handle are circumferentially rotatable around the crank rotational axis when the first end of the first portion is coupled to the jack.

2. The crank of claim 1, wherein the engagement head is shaped to engage a bit, the bit being couplable to a driver.

3. The crank of claim 2, wherein the engagement head is a standard hex head.

4. The crank of claim 1, wherein the drive shaft is welded to the first portion.

5. The crank of claim 1, wherein the drive shaft comprises a rust resistant material.

6. The crank of claim 5, wherein the drive shaft comprises stainless steel.

* * * * *